US012244104B2

(12) United States Patent
Ruffini et al.

(10) Patent No.: US 12,244,104 B2
(45) Date of Patent: Mar. 4, 2025

(54) HIGH SPEED ELECTRICAL CONNECTOR WITH PREASSEMBLED EMI SHIELDING

(71) Applicant: TE Connectivity Solutions GmbH, Schaffhausen (CH)

(72) Inventors: Nicholas Paul Ruffini, Lancaster, PA (US); Lynn Robert Sipe, Mifflintown, PA (US); Brian Todd Klinger, Harrisburg, PA (US)

(73) Assignee: TE Connectivity Solutions GmbH (CH)

( * ) Notice: Subject to any disclaimer, the term of this patent is extended or adjusted under 35 U.S.C. 154(b) by 322 days.

(21) Appl. No.: 17/732,587

(22) Filed: Apr. 29, 2022

(65) Prior Publication Data

US 2023/0352882 A1 Nov. 2, 2023

(51) Int. Cl.
*H01R 13/6592* (2011.01)
*H01R 13/6463* (2011.01)

(52) U.S. Cl.
CPC ..... *H01R 13/6592* (2013.01); *H01R 13/6463* (2013.01)

(58) Field of Classification Search
CPC ............ H01R 13/6592; H01R 13/6463; H01R 13/6581
See application file for complete search history.

(56) References Cited

U.S. PATENT DOCUMENTS 9,257,796 B1 * 2/2016 Dang ................. H01R 13/6463
9,728,902 B2 * 8/2017 Höher ................ H01R 13/6592
2012/0034809 A1 2/2012 Reimchen
2015/0270647 A1 9/2015 Hoher et al.
2017/0365937 A1 12/2017 Juillet et al.
2020/0412064 A1 12/2020 Nguyen
2022/0094108 A1 3/2022 Watanabe et al.
2023/0352868 A1 11/2023 Ruffini et al.
2023/0352883 A1 11/2023 Ruffini et al.
2023/0352884 A1 11/2023 Ruffini et al.

FOREIGN PATENT DOCUMENTS

DE 202015103479 U1 8/2015
DE 202015100245 U1 2/2016
DE 102019106980 B3 7/2020

OTHER PUBLICATIONS

European Search Report 23170507 Mailed Date Date Sep. 1, 2023 EP App. No 23170507.0-1201.

* cited by examiner

*Primary Examiner* — Vanessa Girardi

(57) ABSTRACT

An assembly for terminating a high speed cable. The assembly includes a shell housing and preassembled crosstalk shield. The shell housing has a mating end and a conductor receiving end, One or more shield receiving recesses extend from the conductor receiving end toward the mating end. The preassembled crosstalk shield has mounting projections which are positioned in the one or more shield receiving recesses. The mounting projections and the one or more shield receiving recesses provide an interference engagement to provide a secure mechanical and electrical connection between the shell housing and the preassembled crosstalk shield.

16 Claims, 4 Drawing Sheets

HIGH SPEED ELECTRICAL CONNECTOR WITH PREASSEMBLED EMI SHIELDING

FIELD OF THE INVENTION

The present invention relates to a high speed electrical connector with preassembled Electromagnetic Interference Shielding (EMI) shielding. In particular, the invention is directed to preassembled EMI shielding which isolates cross talk between high speed differential pairs of conductors.

BACKGROUND OF THE INVENTION

Data transmission rates have steadily increased across high speed cable and the connectors which terminate the cables. Crosstalk due to capacitive and inductive couplings among the closely spaced parallel conductors within the connectors has become increasingly problematic. Connectors with cross talk shields have improved crosstalk performance have to meet the increasingly demanding standards. However, as the crosstalk shields are delicate due to the small size of the differential pairs of conductors, the shell of the connector and the cross talk shields, the assembly of the cross talk shields to the connector shell is difficult and problematic, particularly as the assembly occurs in the field, as the differential pairs of conductors are terminated to the connector.

It is therefore desirable to provide cross talk shielding which is preassembled to the connector shell to properly isolate the cross talk between high speed differential pairs of conductors inserted into the connector housing or shell.

SUMMARY OF THE INVENTION

An embodiment is directed to an assembly for terminating a high speed cable. The assembly includes a shell housing and a preassembled crosstalk shield. The shell housing has a mating end and a conductor receiving end, One or more shield receiving recesses extend from the conductor receiving end toward the mating end. The preassembled crosstalk shield has mounting projections which are positioned in the one or more shield receiving recesses. The mounting projections and the one or more shield receiving recesses provide an interference engagement to provide a secure mechanical and electrical connection between the shell housing and the preassembled crosstalk shield.

In various embodiments the preassembled crosstalk shield may include a first shield member and a second shield member. Each of the first shield member and the second shield member have a first portion, a second portion and a third portion. The first portions of the first shield member and the second shield member have one or more first embossments and one or more second embossments which extend therefrom.

In various embodiments the interference engagement of the first embossments and second embossments of the third portions of the first shield member and the second shield member with walls of the one or more shield receiving recesses provides at least 12 points of contact to provide a stable interference engagement therebetween. The interference engagement provides a push out force of greater than 3 lbs.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
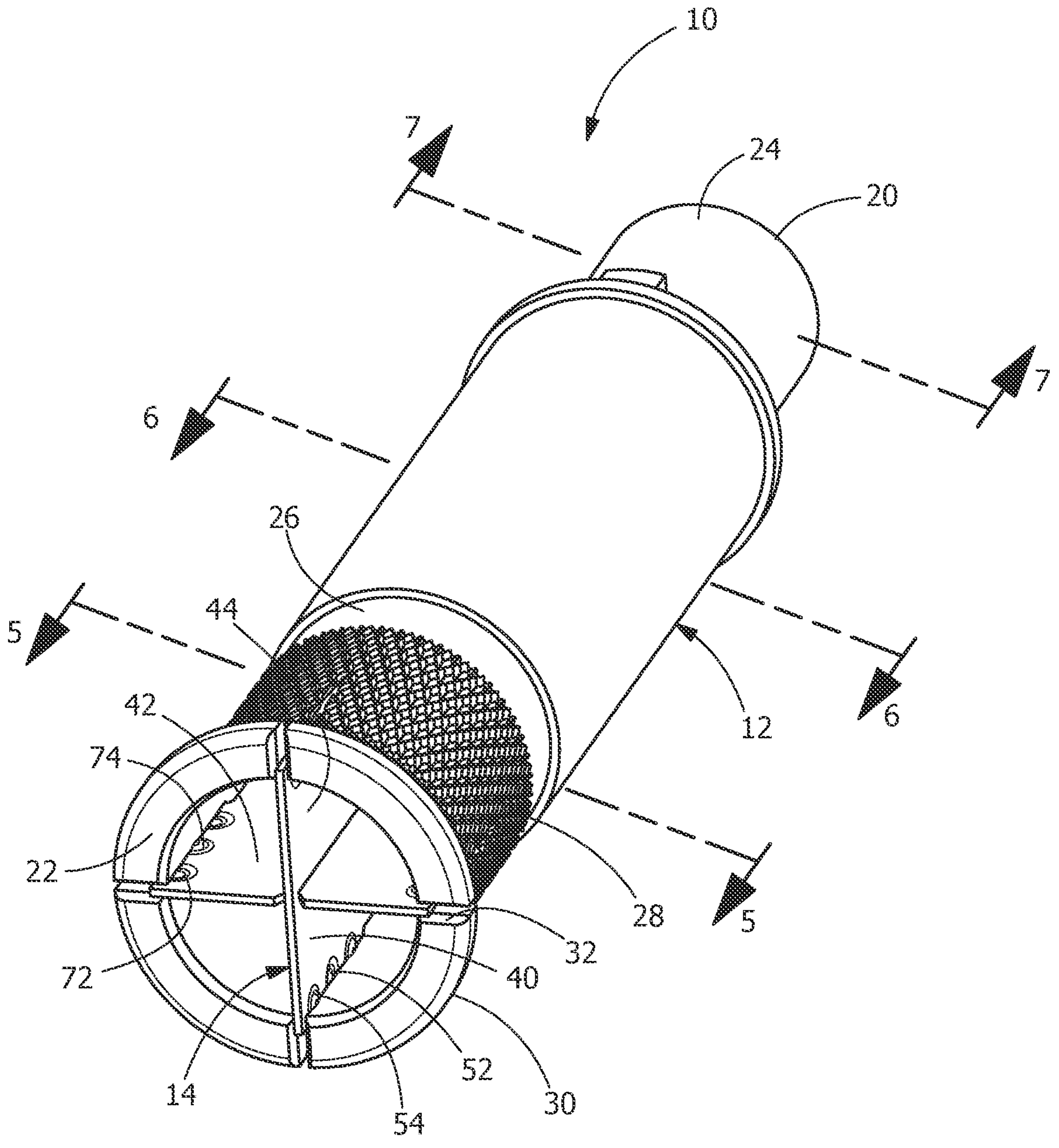
FIG. 1 is a perspective view of an illustrative shell housing of a high speed electrical connector assembly with an illustrative preassembled crosstalk shield assembled thereto.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
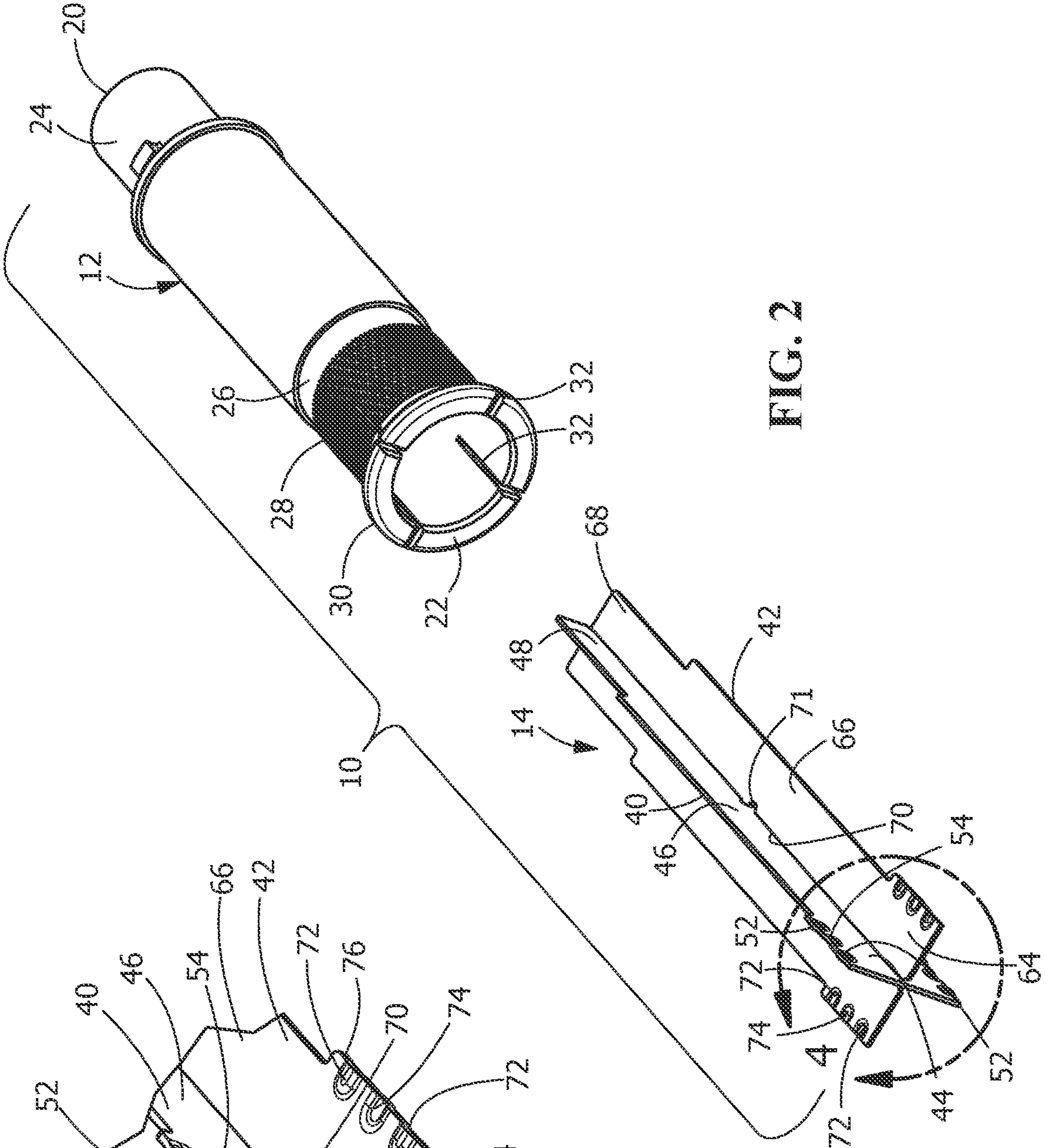
FIG. 2 is a perspective view of the shell housing of FIG. 1 with the illustrative crosstalk shield exploded therefrom.

As shown in FIGS. 1 and 2, an electrical connector assembly 10 has a shell housing 12 and a preassembled crosstalk shield 14. The connector assembly 10 may be a plug connector assembly or a receptacle connector assembly.

The shell housing 12 has a mating end 20 and a conductor receiving end 22. In the illustrative embodiment shown, the shell housing 12 has a mating portion 24 proximate the mating end 20. The mating portion 24 has a smaller outside diameter than the remainder of the shell housing 12. However, other configurations of the shell housing 12 may be used.

A recessed portion 26 is provided on the shell housing 12 proximate the conductor receiving end 22. The recessed portion 26 has multiple projections 28 which extend from the surface thereof. A shoulder 30 extends circumferentially around the conductor receiving end 22 of the shell housing 12. The shoulder 30 is provided at one end of the recess portion 26. However, other configurations of the shell housing 12 may be used.

Crosstalk shield receiving recesses or slots 32 extend from the conductor receiving end 22 toward the mating end 20. The crosstalk shield receiving slots 32 extend through the shoulder 30 and into the recessed portion 26. In the embodiment shown, four crosstalk shield receiving slots 32 are provided to accommodate the configuration of the crosstalk shield 14. However, other numbers of crosstalk shield receiving slots 32 may be used to accommodate different configurations of the crosstalk shield 14.

Figure 4:
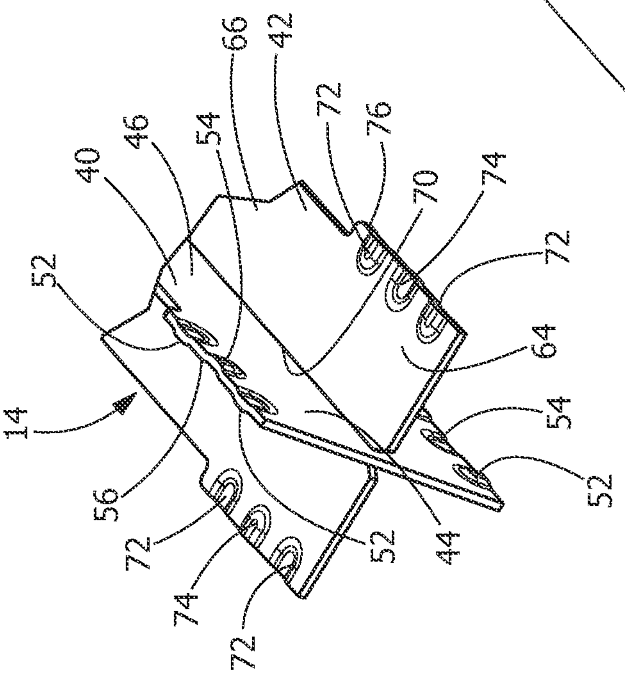
FIG. 4 is an enlarged portion of the mounting portion of the illustrative crosstalk shield shown in FIG. 3.
Figure 3:
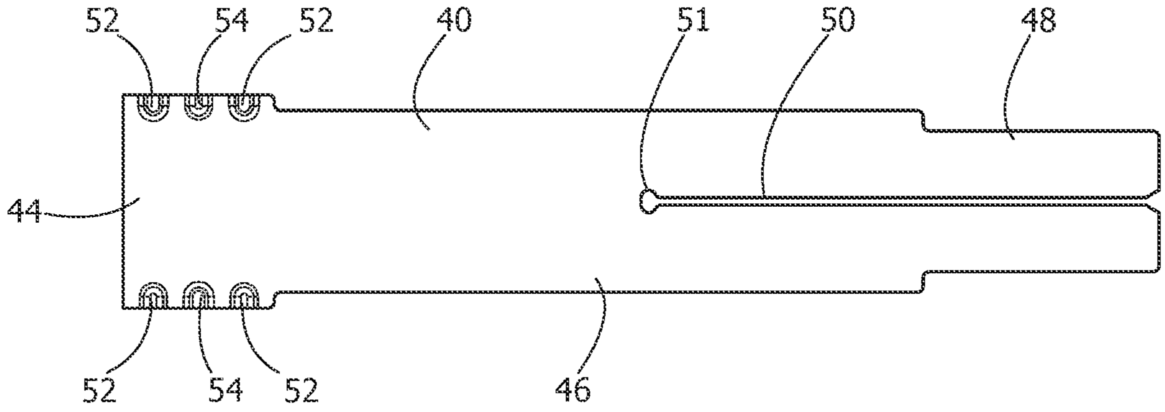
FIG. 3 is a side view of one portion of the illustrative crosstalk shield of FIG. 2.
Figure 5:
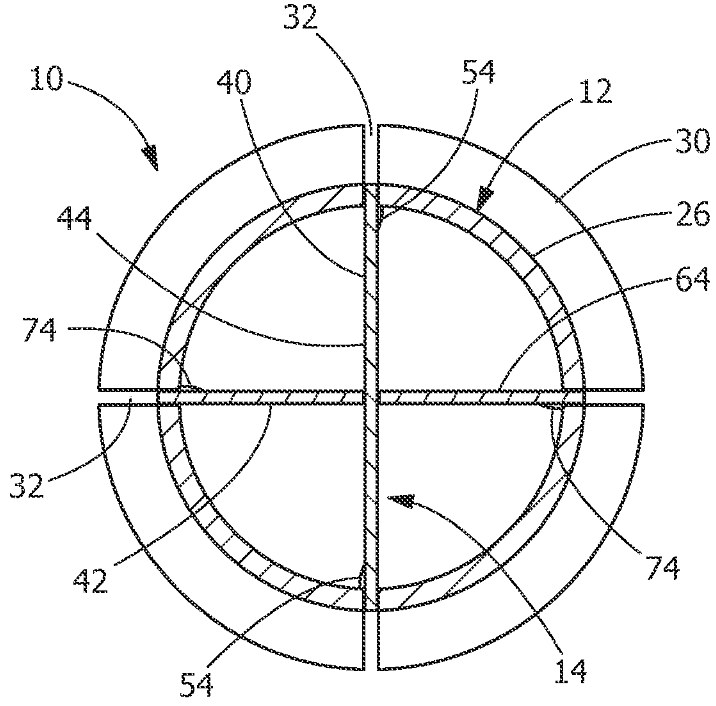
FIG. 5 is a cross-section of the shell housing and the crosstalk shield of the high speed electrical connector taken along ling 5-5 of FIG. 1.
Figure 6:
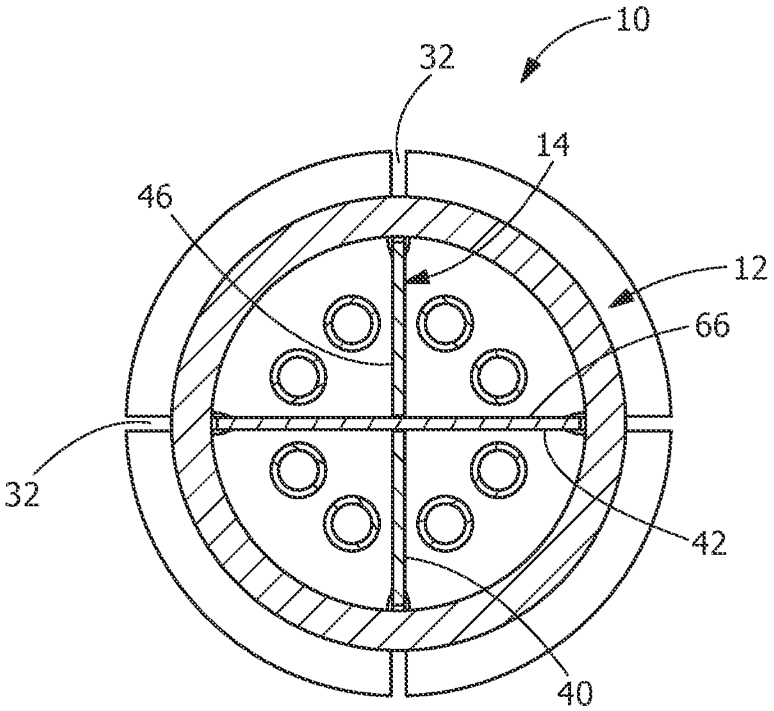
FIG. 6 is a cross-section of the shell housing and the crosstalk shield of the high speed electrical connector taken along ling 6-6 of FIG. 1.
Figure 7:
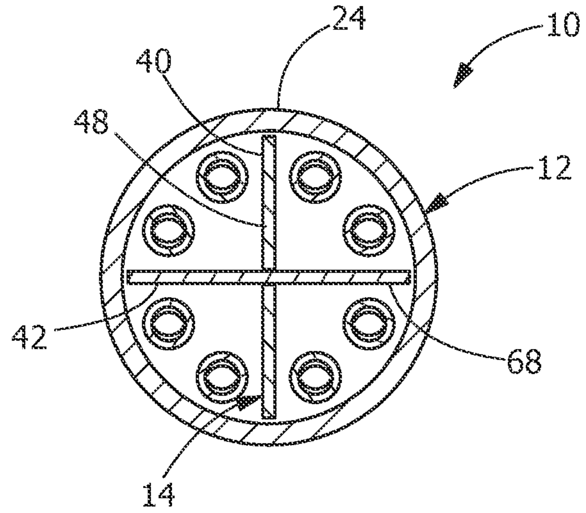
FIG. 7 is a cross-section of the shell housing and the crosstalk shield of the high speed electrical connector taken along ling 7-7 of FIG. 1.

Referring to illustrative embodiment shown in FIGS. 2 through 4, the preassembled crosstalk shield 14 has a first shield member 40 and a second shield member 42. In the illustrative embodiment, the first shield member 40 and the second shield member 42 are made from nickel silver material, however, other materials, including corrosion resistant materials, may be used which exhibit the shielding characteristics required.

As shown in FIG. 3, the first shield member 40 has a first portion 44, a second portion 46 and a third portion 48. The first portion 44 has a larger width than the second portion 46, and the second portion 46 has a larger width than the third portion 48. When assembled, the first portion 44 is positioned in the crosstalk shield receiving slots 32, the third portion 48 is provided in the mating portion 24 of the shell housing 12, and the second portion 46 extends between the first portion 44 and the third portion 48. A mating slot 50 extends from the third portion 48 into the second portion 46. A relief area 51 is provided at the end of the mating slot 50 to allow for the mating slot 50 to open as the second shield member 42 is inserted into the mating slot 50.

As shown in FIG. 4, the first portion 44 has one or more first projections or embossments 52 and one or more second projections or embossments 54 which extend therefrom. The first embossments 52 extend from ends 56 of the first portion 44 in a direction which is essentially perpendicular to the longitudinal axis of the first portion 44. The second embossments 54 extend from ends 56 of the first portion 44 in a direction which is essentially perpendicular to the longitudinal axis of the first portion 44, and in a direction opposite from the first embossments 52.

The second shield member 42 has a first portion 64, a second portion 66 and a third portion 68. The first portion 64 has a larger width than the second portion 66, and the second portion 66 has a larger width than the third portion 68. When assembled, the first portion 64 is positioned in the crosstalk shield receiving slots 32, the third portion 68 is provided in the mating portion 24 of the shell housing 12, and the second portion 66 extends between the first portion 64 and the third portion 68. A mating slot 70 extends from the first portion 64 into the second portion 66. A relief area 71 is provided at the end of the mating slot 70 to allow for the mating slot 70 to open as the first shield member 40 is inserted into the mating slot 70.

The first portion 64 has one or more first projections or embossments 72 and one or more second projections or embossments 74 which extend therefrom. The first embossments 72 extend from ends 76 of the first portion 64 in a direction which is essentially perpendicular to the longitudinal axis of the first portion 64. The second embossments 74 extend from ends 76 of the first portion 64 in a direction which is essentially perpendicular to the longitudinal axis of the first portion 64, and in a direction opposite from the first embossments 72.

In the illustrative embodiment shown, first embossments 52, 72 and second embossments 54, 74 are shown on every third portion 48, 68 of the first shield member 40 and the second shield member 42. However, in other embodiments, first embossments 52, 72 and second embossments 54, 74 may not be provided on every third portion 48, 68 of the first shield member 40 and the second shield member 42. In the illustrative embodiment shown, the first shield member 40 is positioned at essentially a right angle to the second shield member 42.

During manufacturing, the first shield member 40 is inserted into the mating slot 70 of the second shield member 42 and the second shield member 42 is inserted into the mating slot 50 of the first shield member 40 to form the crosstalk shield 14 as shown in FIGS. 1 and 2. As this occurs, the mating slots 50, 70 are resiliently deformed, causing the walls of the mating slot 50 to exert a force on the second shield member 42 and the walls of the mating slot 70 to exert a force on the first shield member 40. The first shield member 40 and the second shield member 42 are retained in position relative to each other by the friction engagement of the walls of the mating slots 50, 70 with the second shield member 42 and the first shield member 40.

With the crosstalk shield 14 properly assembled, the crosstalk shield is inserted into the shell housing 12 through the conductor receiving end 22. As this occurs, the third portions 48, 68 of the first shield member 40 and the second shield member 42 are positioned in the mating portion 24 of the shell housing 12. As insertion occurs, the first portions 44, 64 of the first shield member 40 and the second shield member 42 are positioned in the recessed portion 26 of the shell housing 12.

When fully inserted, the third portions 48, 68 of the first shield member 40 and the second shield member 42 are positioned spaced from the walls of the mating portion 24 of the shell housing 12. However, other configurations may be used.

In the fully inserted position, the ends 56, 76 of the first portions 44, 64 of the first shield member 40 and the second shield member 42 are positioned in the crosstalk shield receiving slots 32 of the shell housing 12. In this position, the first embossments 52, 72 and second embossments 54, 74 of the third portions 48, 68 of the first shield member 40 and the second shield member 42 are deformed by the walls of the crosstalk shield receiving slots 32 to provide a press fit or interference engagement between the first portions 44, 64 of the first shield member 40 and the second shield member 42 and the walls of the crosstalk shield receiving slots 32. The interference engagement provides a secure mechanical and electrical connection therebetween In the illustrative embodiment shown, the engagement of the first embossments 52, 72 and second embossments 54, 74 with the walls of the crosstalk shield receiving slots 32 provides at least 12 points of contact to provide a stable interference engagement therebetween. The interference engagement is sufficient to require a push out force of greater than 3 lbs., greater than 4 lbs., between 3 lbs. and 6 lbs., between 4 lbs. and 5 ilbs. This allows the crosstalk shield 14 to be maintained in the shell housing 12 during shipping. Consequently, the crosstalk shield 14 is assembled or preassembled to the shell housing 12 during manufacturing of the connector assembly 10, rather than in the field where the assembly is currently done.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An assembly for terminating a high speed cable, the assembly comprising:

a shell housing having a mating end and a conductor receiving end, one or more shield receiving recesses extend from the conductor receiving end toward the mating end;

a shoulder extending circumferentially around the conductor receiving end of the shell housing, the one or more shield receiving recesses extending through the shoulder;

a preassembled crosstalk shield having mounting projections, the mounting projections being positioned in the one or more shield receiving recesses, the mounting projections and the one or more shield receiving recesses provide an interference engagement to provide a secure mechanical and electrical connection between the shell housing and the preassembled crosstalk shield.

2. The assembly as recited in claim 1, wherein the one or more shield receiving recesses four are four shield receiving slots.

3. The assembly as recited in claim 1, wherein a mating portion is provided proximate the mating end, the mating portion has a smaller outside diameter than the remainder of the shell housing.

4. The assembly as recited in claim 3, wherein a recessed portion is provided on the shell housing proximate the conductor receiving end, the recessed portion has multiple projections which extend from the surface thereof.

5. An assembly for terminating a high speed cable, the assembly comprising:

a shell housing having a mating end and a conductor receiving end, one or more shield receiving recesses extend from the conductor receiving end toward the mating end;

a preassembled crosstalk shield having mounting projects, the mounting projections being positioned in the one or more shield receiving recesses, the mounting projections and the one or more shield receiving recesses provide an interference engagement to provide a secure mechanical and electrical connection between the shell housing and the preassembled crosstalk shield;

the preassembled crosstalk shield has a first shield member and a second shield member;

the first shield member has a first portion, a second portion and a third portion, the first portion of the first shield member has a larger width than the second portion of the first shield member, and the second portion of the first shield member has a larger width than the third portion of the first shield member;

the second shield member has a first portion, a second portion and a third portion, the first portion of the second shield member has a larger width than the second portion of the second shield member, and the second portion of the second shield member has a larger width than the third portion of the second shield member.

6. The assembly as recited in claim 5, wherein the first shield member and the second shield member are nickel silver.

7. The assembly as recited in claim 5, wherein the first portion of the first shield member is positioned in respective shield receiving recesses of the one or more shield receiving recesses, the third portion of the first shield member is provided in the mating portion of the shell housing, and the second portion of the first shield member extends between the first portion of the first shield member and the third portion of the first shield member.

8. The assembly as recited in claim 7, wherein the first portion of the first shield member has one or more first embossments and one or more second embossments which extend therefrom.

9. The assembly as recited in claim 8, wherein the first embossments extend from ends of the first portion of the first shield member in a direction which is essentially perpendicular to a longitudinal axis of the first portion of the first shield member, the second embossments extend from ends of the first portion of the first shield member in a direction which is essentially perpendicular to the longitudinal axis of the first portion of the first shield member, and in a direction opposite from the first embossments.

10. The assembly as recited in claim 9, wherein a mating slot of the first shield member extends from the third portion of the first shield member into the second portion of the first shield member, a relief area of the first shield member is provided at the end of the mating slot of the first shield member to allow for the mating slot of the first shield member to open.

11. The assembly as recited in claim 10, wherein the first portion of the of the second shield member is positioned in respective shield receiving recesses of the one or more shield receiving recesses, the third portion of the second shield member is provided in the mating portion of the shell housing, and the second portion of the second shield member extends between the first portion of the second shield member and the third portion of the second shield member.

12. The assembly as recited in claim 11, wherein the first portion of the second shield member has one or more first embossments and one or more second embossments which extend therefrom.

13. The assembly as recited in claim 12, wherein the first embossments extend from ends of the first portion of the second shield member in a direction which is essentially perpendicular to a longitudinal axis of the first portion of the second shield member, the second embossments extend from ends of the first portion of the second shield member in a direction which is essentially perpendicular to the longitudinal axis of the first portion of the second shield member, and in a direction opposite from the first embossments.

14. The assembly as recited in claim 13, wherein a mating slot of the second shield member extends from the first portion of the second shield member into the second portion of the second shield member, a relief area of the second shield member is provided at the end of the mating slot of the second shield member to allow for the mating slot of the second shield member to open.

15. The assembly as recited in claim 13, wherein the interference engagement of the first embossments and second embossments of the third portions of the first shield member and the second shield member with walls of the one or more shield receiving recesses provides at least 12 points of contact to provide a stable interference engagement therebetween.

16. The assembly as recited in claim 13, wherein the interference engagement provides a push out force of greater than 3 lbs.

* * * * *